M. C. WHITE & O. C. DURYEA.
POWER DEVICE.
APPLICATION FILED APR. 22, 1912.
1,054,728.
Patented Mar. 4, 1913.
4 SHEETS—SHEET 2.
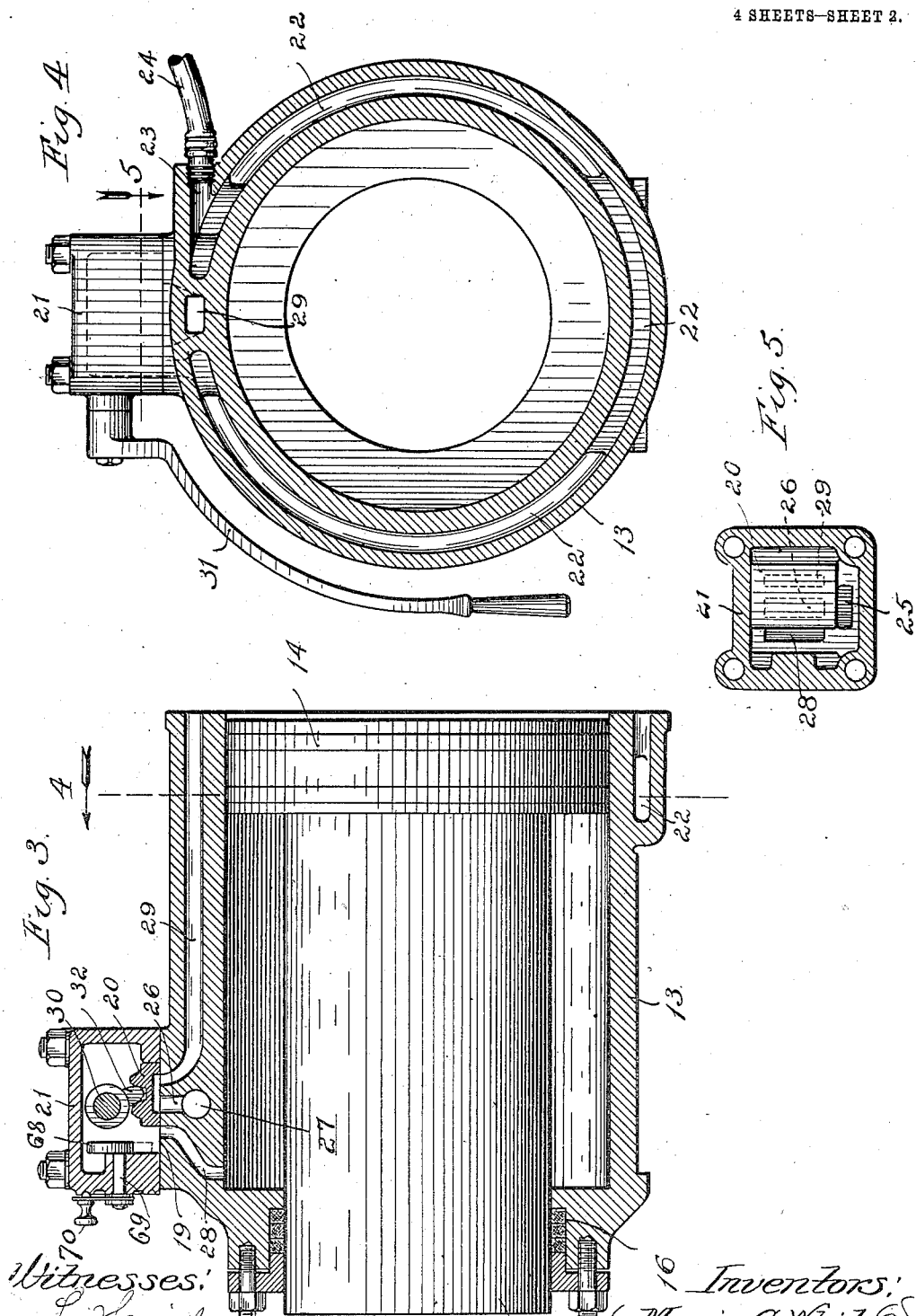

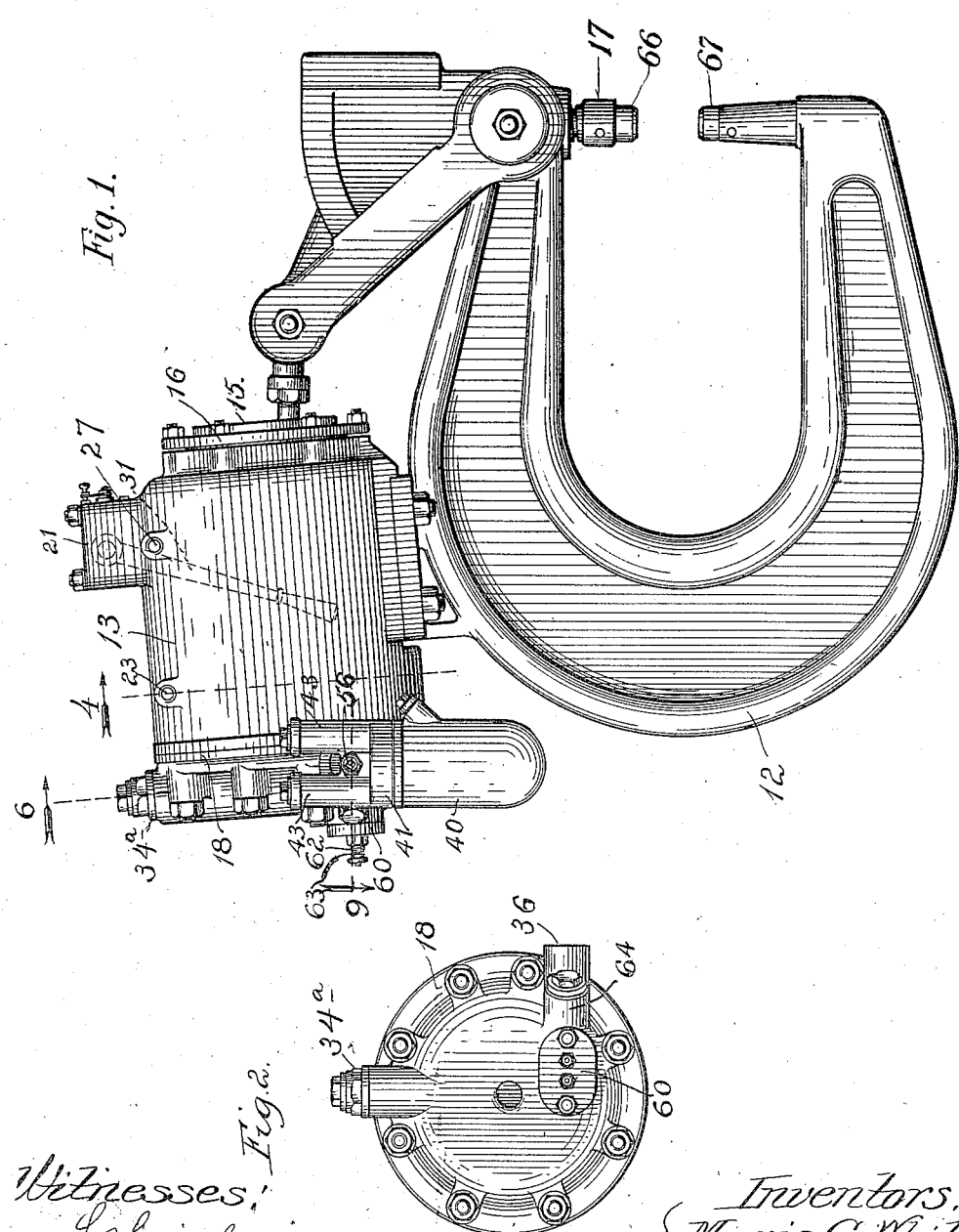

M. C. WHITE & O. C. DURYEA.
POWER DEVICE.
APPLICATION FILED APR. 22, 1912.
1,054,728.
Patented Mar. 4, 1913.
4 SHEETS—SHEET 3.
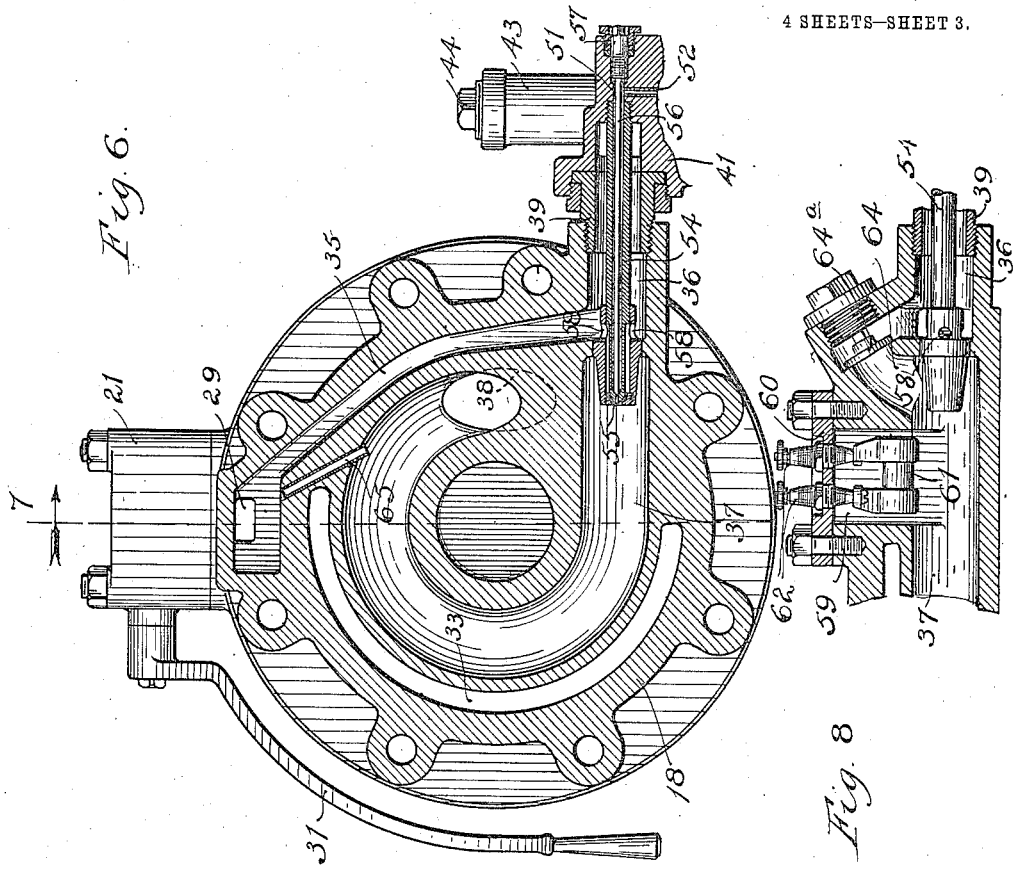
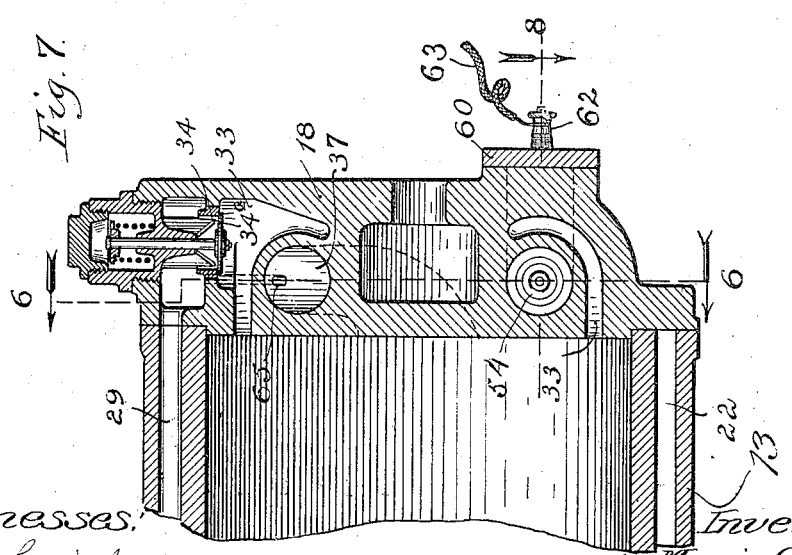
Witnesses:
L. Heisler
G. F. Chase
Inventors:
Morris C. White,
Otho C. Duryea,
By Dyrenforth, Lee, Chritton & Wiles
Attys

M. C. WHITE & O. C. DURYEA.
POWER DEVICE.
APPLICATION FILED APR. 22, 1912.

1,054,728.

Patented Mar. 4, 1913.

4 SHEETS—SHEET 4.

Witnesses:
L. Heisler
G. F. Chase

Inventors:
Morris C. White and
Otho C. Duryea,
By Dyrenforth, Lee, Chritton & Wiles
Attys.

UNITED STATES PATENT OFFICE.

MORRIS C. WHITE AND OTHO C. DURYEA, OF CHICAGO, ILLINOIS.

POWER DEVICE.

1,054,728.　　　　　　　Specification of Letters Patent.　　Patented Mar. 4, 1913.

Application filed April 22, 1912. Serial No. 692,439.

*To all whom it may concern:*

Be it known that we, MORRIS C. WHITE and OTHO C. DURYEA, citizens of the United States, residing at Chicago, in the county of Cook and State of Illinois, have invented new and useful Improvements in Power Devices, of which the following is a specification.

Our invention relates to improvement in power-devices of the type first shown and described in an application for Letters Patent filed by us December 4, 1911, and bearing Serial No. 663,870, and which consist, broadly stated, in a cylinder adapted for connection with a compressed-air supplying conduit, or pipe-line, and containing a piston to be driven primarily by the compressed air.

The device is equipped with means for directing into the cylinder, simultaneously with the compressed air, an ignited combustible mixture, or the hot products of combustion of such a mixture, which generates power by its own expansion to supplement the driving power of the compressed air against the piston and also heats and thus augments the expansive force of the compressed air.

The invention is well adapted for pneumatic power-riveters and other air-driven machines, its purpose being primarily to economize in the use of compressed air.

Our object is to provide certain improvements in the construction of our aforesaid power-device with a view, more especially, of better adapting it for its purpose under all conditions in use.

Figure 9:
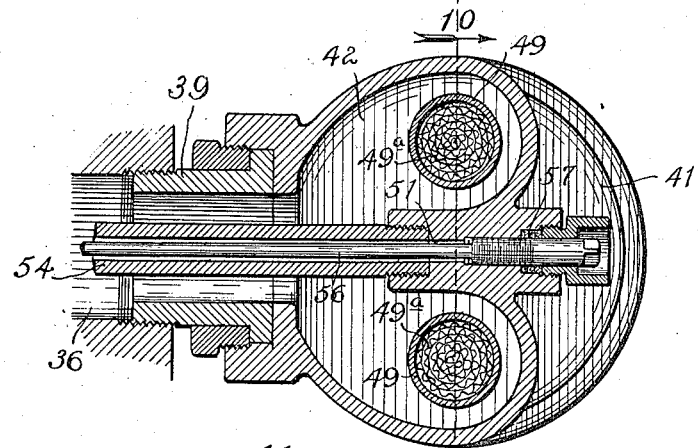
Figure 10:
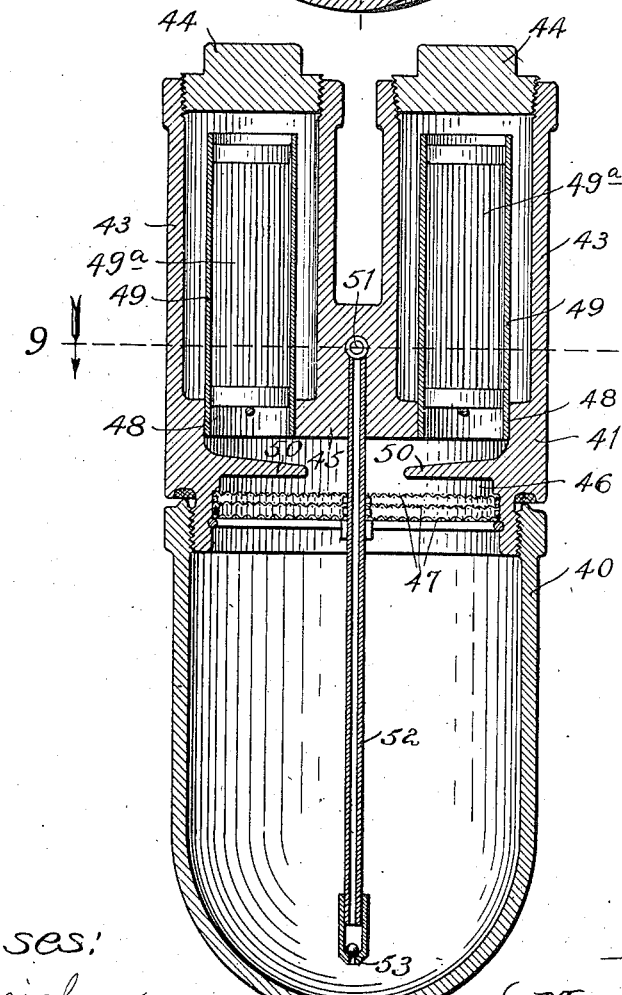

Referring to the accompanying drawings, which show our improvements in connection with a power-riveter, Figure 1 is a side elevation of the devices; Fig. 2, an elevation of the rear cylinder-head; Fig. 3, an enlarged, central, longitudinal, section of the cylinder with the rear cylinder-head removed; Fig. 4, an enlarged section taken on line 4 in Fig. 1, corresponding with line 4 in Fig. 3; Fig. 5, a plan section taken on line 5 in Fig. 4; Fig. 6, an enlarged section taken on line 6 in Fig. 1, corresponding with irregular line 6—6 in Fig. 7; Fig. 7, a section taken on line 7 in Fig. 6; Fig. 8, an enlarged broken section taken on line 8 in Fig. 7; Fig. 9, an enlarged plan section of a gasolene-supplying tank, taken on line 9 in Fig. 1, corresponding with line 9 in Fig. 10; and Fig. 10, a vertical section of the same taken on line 10 in Fig. 9.

Mounted on the yoke-frame 12 of the riveter, is a cylinder 13 containing a piston having a head 14 and a trunk 15, the latter working through a stuffing-box 16 in the front cylinder-head. The piston is connected through links and toggles with the tool-holder 17, in a common manner. Closing the rear end of the cylinder is a cylinder-head 18, and on the cylinder in the position shown is a flat seat 19 for a slide-valve 20. Covering the seat 19 and housing the slide-valve is a valve-chest or box 21. The cylinder-wall throughout the greater part of its extent is cored to form an air-jacketing chamber 22 having an inlet-port 23 which, in practice, is connected with a compressed-air-supplying pipe-line 24. The chamber 22 communicates through a port 25 with the interior of the valve-chest 21 at one side of the path of the slide-valve 20. In the valve-seat 19 is a central exhaust-port 26, communicating with an exhaust-passage 27, extending to the exterior of the cylinder-wall; at one side of the port 26 is a port 28 communicating with the interior of the cylinder adjacent to the stuffing-box 16; and on the opposite side of the port 26 is a port 29 extending to the cylinder head 18. Journaled in the valve-chest 21 is a rock-shaft 30, having an operating handle 31 and provided with a wing or finger 32 engaging the slide-valve 20. In the inner face of the cylinder-head 18 is an approximately semi-circular groove or passage 33 open throughout to the interior of the cylinder and enlarged at its upper end, as shown in Fig. 7. The passages 29, 33 communicate through a port 34 which is normally closed by a spring-loaded pressure-reducing valve 34ª seating in the direction of the passage 29. Cored in the cylinder-head 18 is a by-passage 35 in open communication at its upper end with the passage 29 and terminating at its lower end in a cylindrical chamber, or passage, 36. Also cored in the cylinder head 18 is a passage 37 forming a combustion-chamber communicating through a flaring outlet 38 with the interior of the cylinder.

Screwed into the open end of the passage 36 is a union or bearing sleeve 39 on which is swiveled a tank 40 adapted to hold gasolene or other suitable volatile hydro-carbon. The tank is screwed or otherwise detachably joined to a head 41 containing an upper chamber 42, formed as illustrated in Fig. 9, in open communication through the sleeve 39 with the chamber or passage 36. Rising from the head 41 are tubular extensions 43 closed at their upper ends by the screw-caps 44. Beneath the chamber 42 and separated therefrom by a horizontal partition, or diaphragm, 45 is a chamber 46 between which and the interior of the tank 40 is a series of horizontally-disposed screens 47. Extending through the partition or diaphragm 45 are openings 48 fitted with upwardly-extending tubes 49 within and concentric with the tubular extensions 43 and opening into the same at their upper ends. The tubes 49 are filled with a porous material in the form of rolls of wire gauze, 49$^a$. At their lower ends the tubes 49 are in open communication with the chamber 46, and in said chamber beneath the tubes 49 are baffles 50. Extending from near the lower end of the tank 40, to a passage 51 in the head 41, is a gasolene-feed tube 52 closed at its lower end by a light, downwardly-seating ball, or check, valve 53. The reference numeral 54 designates a carbureter-tube extending from the port or passage 51 through the sleeve 39 and passage 36 to the chamber 37. In the end of the tube 54 is a spray outlet 55 governed by a needle-valve 56 extending through a stuffing-box 57 in the side of the head. In the tube 54 near the spray outlet 55 are ports 58 communicating with the passage 36. In the cylinder-head 18 and communicating with the passage 37 is an opening 59 closed by a cap 60 carrying an electric igniter 61. The igniter is formed of a spool of highly refractory heat-conducting material surrounded by an electric resistance wire in circuit with binding-posts 62 to which are attached the conducting wires 63 of an electric current supply, not shown. Extending from the chamber 37 to the passage 36 (see Fig. 8) is a port or passage 64 normally closed by a check-valve 64$^a$ which seats in the direction of the chamber 37.

In practice, compressed air from the pipe-line 24, entering the port 23, fills the air-jacket 22 and flows into and fills the valve-chest through the port 25. Before the device is started, electric current is turned into the igniter 61 to raise the temperature thereof to a red heat. To operate the device, the handle 31 is turned to slide the valve 20 to open the port 28 to the exhaust-port 26 and, at the same time, open the port 29 to the valve-chest. The compressed air entering the port 29 moves unobstructedly through the passage 35 and chamber 36 to the chamber 42, filling the tube-extensions 43 and passing downward through the tubes 49 into the chamber 46 to exert pressure through the screens 47 against the liquid fuel in the tank 40. This pressure causes the fuel to rise in the tube 52 and fill the carbureter-tube 54. The compressed-air also enters the ports 58 and sprays the fuel through the spray-opening 55, the air and fuel forming a suitable combustible mixture, which is ignited by the igniter 61, to burn and expand in the chamber 37 and discharge through the flaring outlet 38 into the cylinder behind the piston. The check-valve 34$^a$ is seated by a spring under a pressure, in practice, of about two pounds, so that immediately after the back-pressure in the by-passage 35 starts to build up, the valve 34$^a$ is opened to admit compressed air into the passage 33 and cylinder to exert its force against the piston.

The piston is driven forward by the expansion of the combustible mixture, entering the cylinder through the port 38, and by the direct and expansive force of the compressed-air entering through the port 33. It is not intended in practice that the force exerted by the burning mixture shall equal the pressure of the air-supply in the passage 29, and as a means for accelerating the escape of the hot products of combustion to the cylinder, from the passage or combustion chamber 37, we provide the ejector tube or passage 65 extending from the upper end of the passage 35 into the chamber 37 and pointing in the direction of the outlet 38. The tube or passage 65 is a very desirable feature of our present construction, as it causes the hot products of combustion of the mixture to be ejected with increased rapidity from the combustion chamber into the cylinder. This enables us to provide a smaller combustion chamber than would otherwise be necessary. It will be understood that the force exerted against the piston to drive it forward is that of the compressed-air entering through the pressure-reducing valve 34$^a$, the pressure generated by the burning of the combustible mixture, and the expansion of the air, which has entered through the valve 34$^a$, augmented by the heat of the burning mixture, or hot products of combustion thereof, the expansion of which into the cylinder is aided by the current of air from the tube 65. Thus, in practice, the expansive force of the air directed into the cylinder is raised several fold, with the result that there is great saving in the amount of air necessary to advance the piston with the desired force. In fact, experience with the present device has demonstrated that in the performance of the same work a saving of more than sixty per cent. of the compressed air is effected, as compared with a machine of the same proportions unprovided with our improvements and operated by air alone. The forward movement of the piston thus brought about plunges the tool-holder 17 and work-performing member 66 in the direction of the anvil 67 to produce a complete riveting operation.

To return the parts to initial position, the handle 31 is swung to shift the valve whereby the port 29 is opened to the exhaust port 26 and the port 28 is uncovered. The compressed air entering the port 28 to the cylinder returns the piston, while the exhaust of the cylinder is through the port 38, combustion chamber 37, valve 64ª and passages 36, 35 and 29 to the port 26 and exhaust-passage 27.

The main-passage for compressed-air, from the pipe-line 24 to the cylinder behind the piston, is through the air-jacketing chamber 22, port 29, reducing valve 34ª and semi-circular port 33; while the channel by way of the conduit 35 to the cylinder-port 8 forms a by-passage in which are interposed the carbureter, igniter and combustion-chamber 37. The needle-valve 56 may be easily adjusted to regulate the proportions of fuel and air, as well as the volume of the mixture, entering the combustion chamber in each operation and, owing to the length of the combustion-chamber, approximately complete combustion of the mixture will take place before it enters the cylinder. One purpose of the present construction is to keep the mixture and the air of the main-passage separate until approximately complete combustion of the mixture has taken place and both enter and intermix in the cylinder, for the purpose before stated.

In practice, when electric current is turned into the igniter, it takes an appreciable time for the latter to be raised to the necessary mixture-igniting temperature, and, if the device is started into operation in the meantime, the unignited fuel is apt to condense or accumulate in the combustion-chamber. If this fuel were allowed to accumulate, it would tend to produce a mixture so rich that if later ignited, it might effect an explosion of undue force in the cylinder. In the present construction all danger from this cause is avoided by the act of exhausting through the by-passage, as above described, whereby the combustion-chamber is thoroughly scavenged in each return stroke of the piston and any accumulation of explosive mixture thereby obviated.

As before stated, when the force of the compressed air entering the device is supplemented and augmented by the burning mixture, much less compressed air is necessary for the operation of the device than when compressed air alone is employed. It sometimes happens, in practice, due to the burning out of a fuse, or from some other cause, that the current to the igniter is cut off, making it desirable, for the time being, to work the device with compressed air alone, which requires a much greater volume of compressed air for each operation. In order that the device may operate with desired speed under air-pressure alone, when the burning-mixture is not employed, we provide the mouth of the port 29, in the valve-seat 19, large enough to admit air in comparatively large volume, and at the end of the valve-chest we provide a disk-shaped stop 68 eccentrically mounted upon a shaft 69 provided on the outer side of the valve-chest with a handle 70. When the stop is raised, as indicated in Fig. 3, the slide-valve 20 may be moved to the end of the chest to completely uncover the port 29 and admit compressed air in desired large volume for operation alone, while, when the force of the compressed air is to be supplemented and augmented by the burning mixture, the operator may turn the stop into the path of the valve 20, whereby the latter can be moved a distance which will only partly uncover the port 29, thereby greatly limiting the volume of compressed air admitted for the operation.

By causing the compressed air to fill the air-jacket 22 before passing into the valve-chest, it serves not only to prevent overheating of the cylinder but its absorption of the heat materially increases its efficiency, as will be readily understood. The fuel-tank and attendant parts being swiveled to the cylinder, they will remain upright while the yoke-frame is being swung to different angles in the vertical plane, as is often necessary in the use of a suspended riveter.

The foregoing description is intended to convey a clear understanding of our improvements in what we now believe to be the best form of their embodiment, and no undue limitation should be understood therefrom. It is our intention to claim all that is novel in our invention and that the claims shall be construed as broadly as the prior state of the art may warrant.

What we claim as new and desire to secure by Letters Patent is—

1. In combination with the cylinder and piston of a power-device, a compressed-air-supplying conduit, a main-passage extending from said conduit to the cylinder, a by-passage extending from said main-passage to the cylinder, cylinder feed and exhaust valve-mechanism interposed in said main-passage between said conduit and said by-passage, a carbureter interposed in said by-passage, and an igniter in the by-passage between said carbureter and the cylinder.

2. In combination with the cylinder and piston of a power-device, a compressed-air-supplying conduit, a main-passage extending from said conduit to the cylinder, a by-passage extending from said main-passage to the cylinder, cylinder feed and exhaust valve-mechanism interposed in said main-passage in advance of the by-passage, a pressure-reducing valve interposed in said main-passage beyond said by-passage, a carbureter interposed in said by-passage and an igniter in the by-passage between said carbureter and the cylinder.

3. In combination with the cylinder and piston of a power-device, a compressed-air-supplying conduit, a main-passage extending from said conduit to the cylinder, cylinder feed and exhaust valve-mechanism interposed in said main-passage between said conduit and said by-passage, a carbureter, a combustion-chamber, and an igniter interposed in the by-passage, and means for directing the cylinder-exhaust through said by-passage.

4. In combination with the cylinder and piston of a power-device, a compressed-air-supplying conduit, a main-passage extending from said conduit to the cylinder, a by-passage extending from said main-passage to the cylinder, cylinder feed and exhaust valve-mechanism interposed in said main-passage in advance of the by-passage, a pressure-reducing valve interposed in said main-passage beyond the by-passage, a carbureter, igniter and combustion chamber interposed in the by-passage, and a compressed-air-conducting ejector-tube terminating in the by-passage between the said igniter and the cylinder.

5. In a power-device, the combination of a cylinder and piston, an air-jacketing chamber for the cylinder, a compressed-air-supplying conduit, a main-passage extending from said conduit through said air-jacketing chamber to the interior of the cylinder behind the piston, a by-passage extending from said main-passage to the cylinder behind the piston, cylinder feed and exhaust valve-mechanism interposed in said main-passage between said conduit and said by-passage, a carbureter interposed in said by-passage, and an igniter in the by-passage between the said carbureter and the cylinder.

MORRIS C. WHITE.
OTHO C. DURYEA.

In presence of—
R. A. RAYMOND,
O. C. AVISUS.